March 7, 1967  J. P. LINDHOLM  3,307,935
METHOD OF MAKING STEEL USING SCRAP TOGETHER WITH HOT METAL
AS WELL AS A CHARGING APPARATUS FOR CHARGING
SCRAP INTO A STEEL MAKING FURNACE Filed March 5, 1963  3 Sheets-Sheet 1

INVENTOR
Jörgen P. Lindholm

BY Dicke & Craig
ATTORNEYS

March 7, 1967 J. P. LINDHOLM 3,307,935
METHOD OF MAKING STEEL USING SCRAP TOGETHER WITH HOT METAL
AS WELL AS A CHARGING APPARATUS FOR CHARGING
SCRAP INTO A STEEL MAKING FURNACE
Filed March 5, 1963 3 Sheets-Sheet 3

INVENTOR
Jørgen P. Lindholm

BY Dicke & Craig

ATTORNEYS

United States Patent Office 3,307,935
Patented Mar. 7, 1967

3,307,935
METHOD OF MAKING STEEL USING SCRAP TOGETHER WITH HOT METAL AS WELL AS A CHARGING APPARATUS FOR CHARGING SCRAP INTO A STEEL MAKING FURNACE
Jørgen P. Lindholm, Villa Nila, Las Rozas,
Madrid, Spain
Filed Mar. 5, 1963, Ser. No. 262,873
Claims priority, application Great Britain, Mar. 5, 1962, 8,382/62; Mar. 27, 1962, 11,746/62
16 Claims. (Cl. 75—43)

The present invention relates to a method of making steel using scrap together with hot metal as well as a charging apparatus for charging scrap into a steel making furnace.

It is a purpose of the invention to provide a method which enables an overall improvement of the economy in steel mass production of the type here referred to.

It is a further purpose of the invention to provide a method which enables a decrease of the heat losses in the furnace when charged with scrap.

A further purpose of the invention is to provide a method which provides savings in terms of reduced handling costs and increased furnace production rates.

Still a further purpose of the invention is to provide a charging machine for charging scrap into a steel making furnace which enables charging of a predetermined amount of scrap within a short time.

Still a further purpose of the invention is to provide a machine for charging scrap into a steel making furnace which enables charging of so substantial portions of scrap into an open hearth furnace that repeated opening of the doors as in the usual charging technique with charging boxes can be avoided.

Still a further purpose of the invention is to provide a charging machine to be used with a so-called LD-furnace which is capable of charging preheated scrap to the furnace so as to thereby cut down the melting time of the scrap after the supply of the hot metal, thereby avoiding the cooling down of the melt and enable the scrap charge to be increased without increasing the melting period substantially.

Still a further purpose of the invention is to provide a charging machine for use with an LD-furnace which enables charging of the preheated scrap in such a way that cooling of the hot metal when supplied to the furnace will be avoided to a substantial extent.

Figure 1:
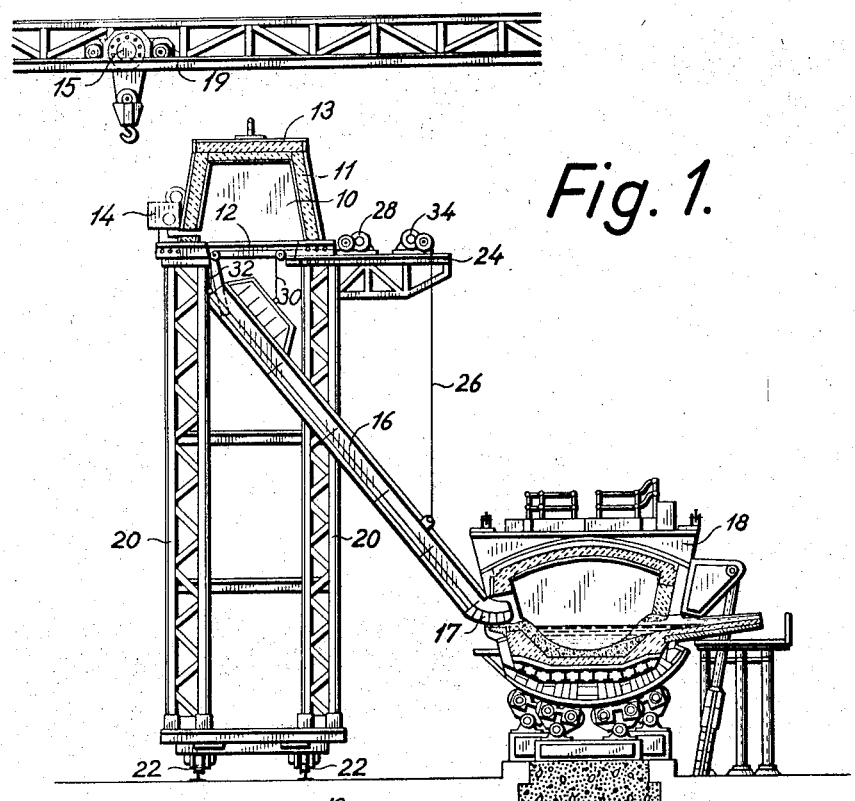
Figure 2:
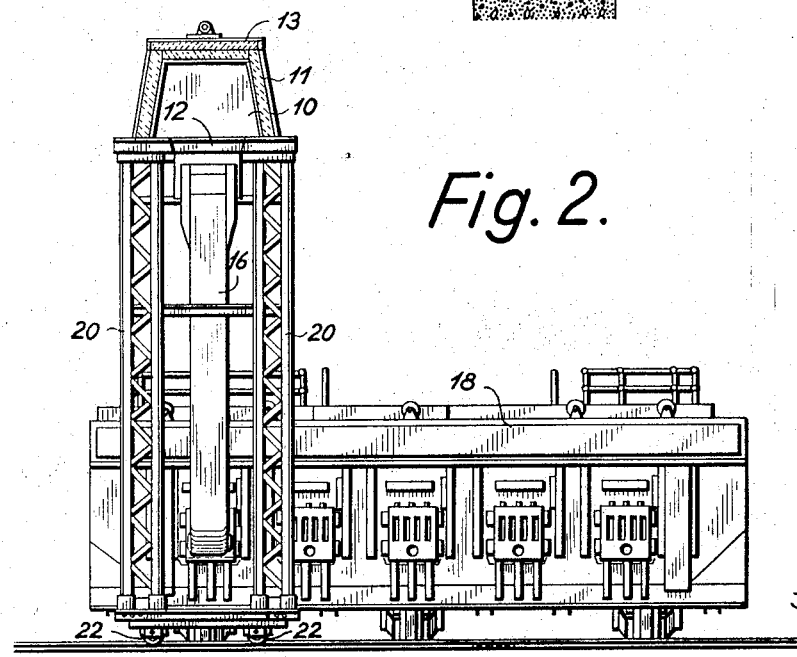
Figure 3:
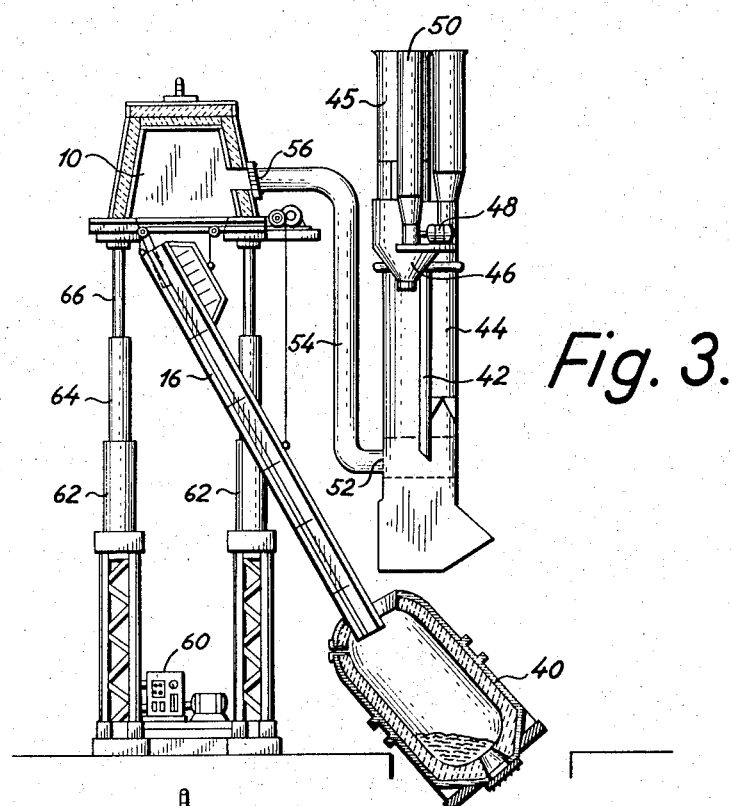
Figure 5:
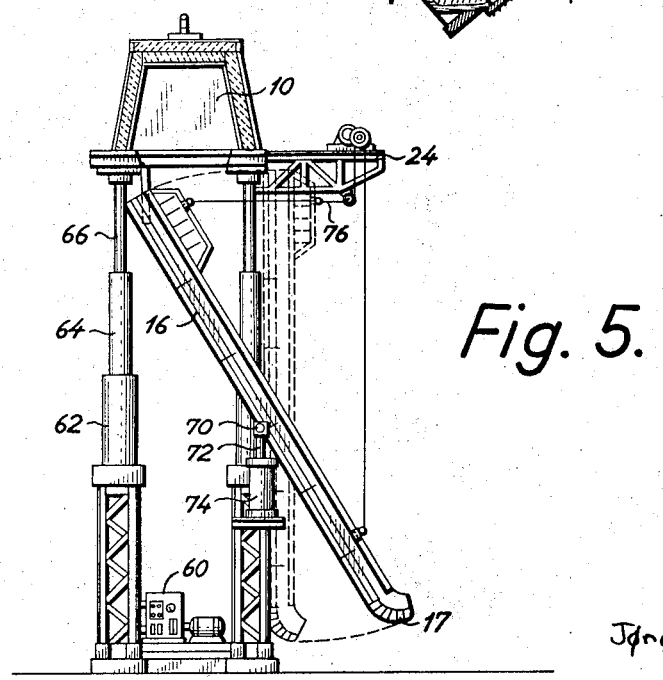
Figure 4:
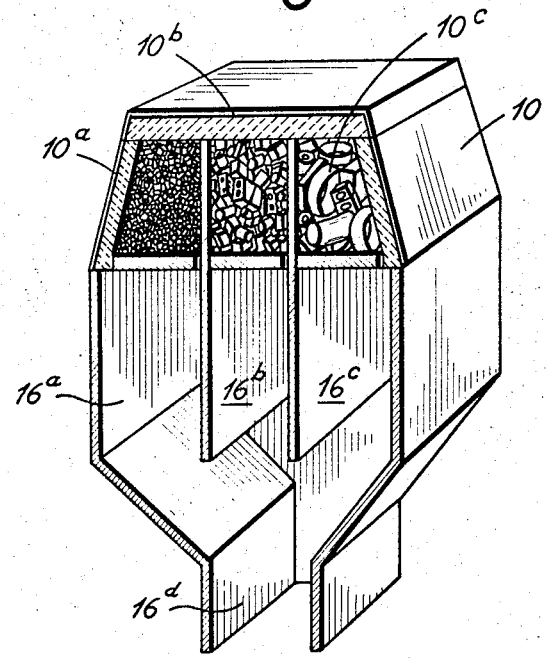
Figure 6:
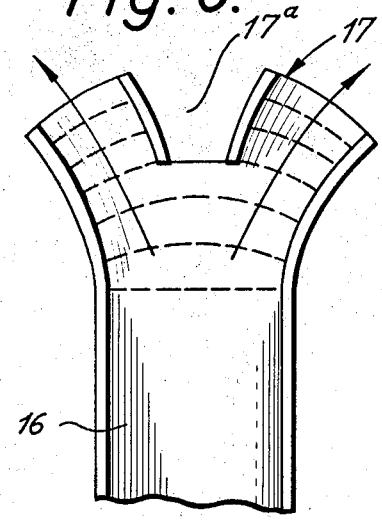

The invention will be further described in the following with reference to the accompanying drawing in which FIGURE 1 is a schematic side view of a charging apparatus according to the invention for use with an open hearth furnace, FIGURE 2 is a front view of the arrangement of FIGURE 1, FIGURE 3 is a schematic side view of a charging apparatus for use with an LD-furnace showing certain details of the arrangement, FIGURE 4 is a schematic perspective view of a modification of a part of the charging apparatus, FIGURE 5 is a more detailed side view of the top portion of the charging apparatus, and FIGURE 6 is a detail of the chute.

In broad terms a machine according to the invention provides a bin 10 effectively providing a scrap container for receiving scrap from a supply and having its bottom in the form of a downwardly opening door 12, means 14 for supplying heat to the contents of the bin and a chute 16 operable to receive the scrap from the bin in response to opening of the door 12 and being capable of being positioned with its lower end extending into the loading aperture of a furnace 18 which in the embodiment of FIGURE 1 is in the form of an open hearth furnace.

The bin 10 with the chute 16 may be supported on a framework 20 or the like capable of running on rails by means of wheels or casters 22 so as to thereby serve an open hearth furnace through each of a plurality of loading doors as indicated in FIGURE 2.

As will be obvious from the foregoing brief description of a scrap charging machine according to my invention the invention also provides a method of making steel using scrap together with hot metal in a steel making furnace, comprising the steps of preheating at least one predetermined amount of scrap, rapidly charging the furnace with the preheated amount of scrap, processing the hot metal and the scrap mixture to effectively produce steel in the furnace, and recovering the steel produced in the form of ingots.

Since scrap is a substantially irregular material of different sizes and thicknesses, the preheating of the scrap in the bin 10 presents certain problems. If the scrap is preheated to a temperature which is too high, the scrap may become cloggy which will prevent the free flow of the scrap through the chute 16. It is therefore important that the preheating temperature should be controlled so as to not exceed a temperature at which the scrap becomes cloggy. On the other hand it is important that the scrap is preheated to a temperature which is high enough to avoid substantial cooling of the hot metal which comes into contact with the scrap.

The preheating means may be in the form of oil burners in which event the flame control and the time should be selected and controlled in accordance with the density of the scrap charged into the bin 10. Instead of oil burners also plasma torches may be used for the preheating in which event higher temperatures may be employed in very short time so as to obtain flash heating without clogging.

Since the charging of the furnace only takes place at intervals, means is preferably provided for preventing the scrap from cooling down again. For this purpose the walls of the bin 10 are heat-insulated at 11, for example by means of suitable heat-insulating material, such as glass wool. In addition, in order to prevent the heat from escaping upwards a heat-insulating cover 13 may be provided suspended for example under a movable crane 15 running on rails 19 so as to be removed when the bin is charged and put in covering position quickly after the charging.

It is important that the downwardly opening door 12 is of the quick-releasing type so as to enable the scrap to be loaded quickly to the furnace. In addition, as obvious from FIGURE 1, the bin is of conical configuration or has at least opposite sloping walls with the largest opening downwards, so as to make sure that the scrap is removed quickly from the bin.

As obvious when the door 12 is open and the scrap falls down into the chute, the speed at which the scrap is charged into the furnace will vary according to the angle of the chute and depending on the density of the scrap employed. In the case of heavy scrap therefore the angle or vertical inclination should be less than in the case of light scrap.

To this purpose the chute 16 is suspended in such a manner that its outlet into the furnace opening can be maintained in substantially the same height, but the top end can be lowered or raised so as to thereby vary the inclination of the chute. To this purpose a beam 24 is arranged adjacent the top of the frame or tower 20 from the end of which the lower end of the chute 16 is suspended in a steel wire or chain 26. On the frame structure a winch 28 is provided adapted to be remote-controlled. From the winch a pair of wires 30 and 32 is guided over rollers or pulleys and connected with the top end of the chute so as to thereby adjust its inclination. A second winch 34 is provided to operate the wire or chain 26 for the purpose of lowering the bottom end of the chute after the furnace has been charged so as to bring the chute in a substantially vertical position inside the frame structure.

From the foregoing it will be obvious that in order to prevent damage of the refractory bricks inside the furnace 18 it should be prevented that heavy scrap is charged at high speed. To avoid this the bin 10 may be loaded with scrap in such a way that light scrap is in the bottom and the more heavy scrap is in the top whereby the light scrap will reach the furnace as a bottom layer and act as a cushion which absorbs the shock from the heavy scrap coming thereafter.

A modified construction of the bin which provides for charging the furnace with scrap of different density in desired sequence is shown in FIGURE 4. Here the bin is divided into three compartments 10a, 10b, and 10c, each with an individual charging door, and the top end of the chute is by means of two partitions divided into three chute channels 16a, 16b, and 16c which are merging into a single lower chute channel 16d.

In use of the bin and chute arrangement of FIGURE 4 the compartments may be loaded with scrap of different density, for example light, medium and heavy, in each compartment. It will be obvious that then the light scrap is charged in the beginning, thereafter the medium scrap and eventually the heavy scrap.

The bin arrangement of FIGURE 4 also has the advantage of providing individual temperature control of the heating of the scrap in the three bin compartments so that in the compartment with the low density bin a lower temperature is used than in the other compartments, sufficiently to prevent clogging of the scrap.

As illustrated in FIGURE 1 the lower end of the chute 16 is provided with a curved lip 17 which effectively provides a member for evenly distributing the scrap over the bottom surface of the furnace 18. To this purpose the lip 17 is curved in vertical direction but has as shown in FIGURE 6 a centrally located cut-away portion 17a so as to secure that also the bottom zone of the furnace immediately inside the door is charged with scrap material. In addition the lip 17 has as shown in FIGURE 5 sidewardly extending portions, and if desired guide members may be provided at each side of the cut-away portion 17a to distribute the scrap in two directions on each side of the central zone.

A modified bin and chute arrangement according to the invention is shown in FIGURE 3 in connection with an LD-furnace. The bin and the chute are referred to by the same reference numerals as in FIGURES 1 and 2. 40 designates an LD-furnace shown in tilted position as conditioned for being charged with scrap. 42 designates the oxygen lance and the dust collection and waste heat economy system is shown schematically with the waste heat boiler indicated at 44. 45 designates the stack while 46 is the wet filter for the dust collection system from which the gasses are passed by means of the exhauster 48 to the exhaust stack 50.

In connection with an LD-furnace my invention provides for preheating of the scrap in the bin 10 before charging by recovering a portion of the heat in the exhaust gasses from the previous blow of the LD-furnace. To this purpose the waste heat economy and dust collecting system is branched off at 52, for example at the by-pass gate for the waste heat boiler and a part of the hot gasses is through a duct 54 led to the bin 10 through an aperture in the wall thereof which may be covered by a grill 56 of sufficiently rigid and heat resisting material, such as for example refractory bricks of the type having apertures therethrough. The scrap can of course also be preheated as previously explained.

Obviously in connection with an LD-furnace the rapid charging obtained by means of the chute 16 provides for recovery of a higher portion of the sensible heat in the vessel lining after tapping because the furnace is not only charged with preheated scrap but can be charged with all the scrap desired within the time limit available during the cycle.

A typical cycle of running an LD-vessel is that during the first two minutes scrap is charged usually by means of charging boxes. The next two minutes are used for pouring in hot metal, and after tilting of the vessel into vertical position which takes about one minute, lime is added through chutes on each side. The lance is thereafter adjusted to the desired height above the metal surface and oxygen supply is started with the necessary pressure. After about forty seconds, i.e. after about six minutes after start of the cycle, the flame grows to a substantial height such as seven metres, and after another six-seven minutes the flame becomes bright and further limestone is added in portions until at about the twentieth minute the flame is hottest with a peak between the twelth and seventeenth minute of glowing time, the end of blow is about after twenty-three minutes and the rest of the cycle up until about half an hour is occupied by de-slagging and pouring out the steel.

Obviously only about two minutes are left of this cycle for charging the scrap, and when using charging boxes this short time available puts a limit to the amount of scrap which previously could be used in the LD-process. In addition, the amount of scrap usable in the LD-process has been limited when using cold scrap, because it has been found that the blowing cycle could not be carried out as economically and rapidly as necessary to utilize the advantages of the LD-process when more scrap than what up until now has been considered about 18/25% was used in the form of cold metal.

By using preheating of the scrap in combination with rapid charging as hereinbefore described it is possible to increase the amount of scrap used in the LD-process up until about 40/50% or more which for several reasons is desirable because addition of scrap is not only desirable but necessary for the production of certain types of steel, depending on the analysis of the scrap, besides cost reducing.

As will be obvious from the foregoing, during the charging of the furnace the bin 10 must have a substantial height above floor level which in many cases will be so high that an overhead crane may not be available for charging the bin with scrap.

In order to facilitate the charging of the bin with scrap the frame structure may as indicated in FIGURE 3 include suitable lift or elevator means such as a hydraulic power system 60 adapted to operate hydraulic cylinders 62 having telescope piston members 64 and 66 on the top of which the bin 10 is supported.

Obviously hereby it is possible to operate the hydraulic system to lower the bin 10 to such a height in which it can easily be charged from a magnetic conveyor of an overhead crane, or even to such a low height that the bin can be charged from a transportable conveyor or the like.

In such event, in order to move the chute free of the bin to provide for lowering of the bin, the chute may as shown in FIGURE 5 be mounted tiltably near its middle point about a pivot 70, for example on the end of a piston rod 72 of an auxiliary hydraulic cylinder 74 which when actuated lowers the chute so that it can be tilted about its pivot 70 and by means of an auxiliary wire 76 be moved to a substantially vertical position as indicated in dotted lines which provides for free unobstructed lowering of the bin.

Alternatively it will be possible to construct a charging apparatus according to the invention for portable purpose by suspending the bin as well as the chute and its auxiliary machinery including the winches 24 and 28 in a crane.

As an example of the use of my charging apparatus in connection with a furnace designed for a total charge of 60 tons, it can be mentioned that the capacity of the bin should be approximately 25–30 tons, and that with adjustment of the chute it will be possible to charge the furnace with for example 25 tons within two minutes, and if necessary even within one minute. For LD-furnaces of smaller or larger dimensions the proportion will remain the same.

In practice with respect to the temperatures to which the scrap should be preheated the important rule is as mentioned hereinbefore that the preheating temperature should not be higher than below that at which the material will not clog.

Since this temperature varies considerably with the scrap no definite temperature limits can be stated but as a rule it should be mentioned that the temperature may vary between 300 and 800 centigrade, and it is believed that an optimum would be between 500 and 600 centigrade.

Though the invention in the foregoing has been described with reference to schematic drawings and no details are given with respect to the structures, it will be understood that such details can easily be worked out by those skilled in the art of construction of machinery for the steel-mill industry, and it is believed that the description of the general concept of the invention is sufficient to enable those skilled in this profession to carry out the invention.

I claim:

1. In apparatuses for charging a steel making furnace having a plurality of loading doors with scrap in combination: a bin effectively providing a container for a predetermined amount of scrap, a frame structure effectively providing a support for said bin, means for supplying heat to scrap material enclosed inside said bin, a chute effectively providing a passageway for scrap material from said bin to said furnace, means operatively supporting said chute on said frame structure, and means for delivering scrap from said bin to said chute, and means supporting said frame structure for movement along said furnace to selectively deliver said scrap from said chute through selected ones of said loading doors.

2. In apparatuses for charging a steel making furnace with scrap in combination: a bin effectively providing a container for a predetermined amount of scrap, means for supplying heat to scrap material enclosed inside said bin, an inclined chute effectively providing a passageway operable to guide said scrap material from said bin to said furnace exclusively under influence of the gravity, means operable to adjust the inclination of said chute, and means for releasing said scrap from said bin to said chute.

3. In apparatuses for charging a steel making furnace with scrap in combination: a bin effectively providing a container for a predetermined amount of scrap, means for supplying heat to scrap material enclosed inside said bin, an inclined chute effectively providing a passageway operable to guide said scrap material from said bin to said furnace exclusively under influence of gravity, means effectively suspending said chute including a pivot near the lower end of said chute and means remote from said pivot for varying the height of said chute, and means for releasing said scrap from said bin to said chute.

4. In apparatuses for charging a steel making furnace with scrap in combination: a bin effectively providing a container for a predetermined amount of scrap, means for supplying heat to scrap material enclosed inside said bin, an inclined chute effectively providing a passageway operable to guide said scrap material from said bin to said furnace exclusively under influence of gravity and having an upper scrap receiving end and a lower scrap delivering end, wire suspension means including means for suspending said chute, and winch means operable to vary the length of said wire means to thereby regulate the inclination of said chute, and means for releasing said scrap from said bin to said chute.

5. In apparatuses for charging a steel making furnace with scrap in combination: a bin effectively providing a container for a predetermined amount of scrap and having downwardly facing closure means, means for supplying heat to scrap material enclosed inside said bin, an inclined chute effectively providing a passageway for scrap material from said bin to said furnace, and means for quickly releasing said closure means for delivering the contents of scrap from said bin to said chute.

6. In apparatuses for charging a steel making furnace with scrap in combination: a bin structure effectively providing a plurality of portions each capable of receiving a predetermined amount of scrap, means for supplying heat to scrap material enclosed inside said bin portions, a chute structure disposed beneath said bin structure and effectively providing a passageway for scrap material from each of said bin portions to said furnace, and means for selectively releasing scrap from each of said bin portions to said chute structure.

7. In apparatuses for charging a steel making furnace with scrap in combination: a frame structure, a bin structure supported on said frame structure and effectively providing a container for a predetermined amount of scrap material, said bin structure comprising a heat-insulated wall structure having upwardly converging side walls, a top cover and a downwardly opening bottom door, means for supplying heat to said scrap material enclosed within said bin structure, a chute structure supported in said frame structure in inclined position and having a top end disposed to receive scrap material from said bin structure in response to opening of the bottom door thereof and a lower end operable to deliver scrap material into said steel making furnace, means for regulating the inclination of said chute structure, and means for quickly opening said bottom door of said bin structure.

8. In apparatuses for charging a sttel making furnace with scrap in combination: a frame structure, a bin structure supported on said frame structure and effectively providing a plurality of containers, each being capable of holding a predetermined amount of scrap material, said bin structure comprising a wall structure having a downwardly opening bottom door at each of said containers, means for supplying heat to said scrap material enclosed within said bin structure, a chute structure supported in said frame structure in inclined position and having a top end disposed to receive scrap material from each of said bin structure containers in response to opening of the bottom door thereof and a lower end operable to deliver scrap material into said steel making furnace, means for regulating the inclination of said chute structure, and means for individually opening said bottom door of said bin structure.

9. In apparatuses for charging a steel making furnace with scrap in combination: a frame structure, a bin structure, supported on said frame structure and effectively providing at least one container for a predetermined amount of scrap material, said bin structure comprising a wall structure having walls, downwardly opening door means, means for supplying heat to said scrap material enclosed within said bin structure, a chute structure supported in said frame structure in inclined position and having a top end disposed to receive scrap material from said bin structure in response to opening of the door means thereof and a lower end provided with an arcuate lip operable to deliver and effectively distribute scrap material into said steel making furnace, means for regulating the inclination of said chute structure, and means for quickly opening said door means of said bin structure.

10. In apparatuses for charging a steel making furnace with scrap in combination: a bin structure effectively providing a container for a predetermined amount of scrap, means for supplying heat to scrap material enclosed inside said bin, a chute effectively providing a passageway for scrap material from said bin to said furnace and having a lower end adapted to extend into said furnace, said lower end being provided with an arcuate lip having a centrally located cut-away portion, and means for delivering scrap from said bin to said chute.

11. In apparatuses for use with an LD-type steel making furnace for charging said furnace with scrap in combination: a frame structure, a bin structure supported on said frame structure and effectively providing a container for predetermined amount of scrap material, said bin structure comprising a wall structure having downwardly opening bottom door means, means for supplying a portion of the blow gas heat from said LD-furnace to said bin to effectively heat said scrap material enclosed within said bin structure, a chute structure supported in said frame structure in inclined position and having a top end disposed to receive scrap material from said bin structure in response to opening of said bottom door means thereof and a lower end operable to deliver scrap material into said steel making furnace, and means for quickly opening said bottom door means of said bin structure.

12. In apparatuses for use with an LD-type steel making furnace having an oxygen lance and a waste heat economy system for charging said furnace with scrap in combination: a frame structure, a bin structure supported on said frame structure and effectively providing a container for a predetermined amount of scrap material, said bin structure comprising a wall structure having downwardly opening bottom door means, means operatively connecting said waste heat economy system of said LD-furnace with said bin structure for supplying a portion of the blow gas heat from said LD-furnace to said bin to effectively heat said scrap material enclosed within said bin structure, a chute structure supported in said frame structure in inclined position and having a top end disposed to receive scrap material from said bin structure in response to opening of the bottom door thereof and a lower end operable to deliver scrap material into said steel making furnace, and means for quickly opening said bottom door of said bin structure.

13. A method of producing steel using scrap material together with hot metal in an LD-type steel making furnace comprising the steps of preheating at least a plurality of portions of scrap material to temperatures below that temperature at which scrap will clog, imparting rapid movements to said plurality of portions of preheated material solely in the direction of the furnace, the furnace being in a tilted position, said movements being exclusively imparted by gravity and being effective to rapidly charge said furnace with said preheated portions of scrap material, pouring hot metal into said furnace, processing the mixture of hot metal and scrap material to effectively produce steel in said furnace, and recovering the steel produced in the form of ingots.

14. A method of producing steel using scrap material together with hot metal in an LD-type steel making furnace comprising: the steps of preheating a plurality of portions of scrap material by means of a part of the blow gas heat during one cycle of operations of said LD-furnace, retaining said preheated scrap condition for use, imparting rapid movements to said plurality of portions of preheated material solely in the direction of said furnace, said furnace being in a tilted position, said movements being exclusively imparted by gravity and being effective to rapidly charge said furnace with said preheated portions of scrap material at the beginning of the subsequent cycle of operations of said LD-furnace, thereafter pouring hot metal into said furnace and processing the mixture of hot metal and scrap material to effectively produce steel in said furnace, and recovering the steel produced in the form of ingots.

15. A method of producing steel using scrap material together with hot metal in a steel making furnace comprising: the steps of preheating a plurality of portions of different sizes of scrap material to different temperatures below the clogging point, imparting rapid movements to said plurality of portions of preheated material solely in the direction of said furnace, said movements being exclusively imparted by gravity and being effective to rapidly charge said furnace with said preheated portions of scrap material beginning with that of smallest size and terminating with the most heavy, thereafter pouring hot metal into said furnace, and processing the mixture of hot metal and scrap material to effectively produce steel in said furnace, and recovering the steel produced in the form of ingots.

16. A scrap charging apparatus for charging scrap into a selected one of a plurality of charging openings of a furnace comprising: a supporting structure having tiltably mounted therein a chute and adjacent the top end of said chute a scrap container, means supporting said structure for movement between a plurality of different scrap charging positions in each of which the lower end of said chute is operatively connected with a selected furnace charging opening and means for releasing scrap from said container to said chute, said chute being effective to guide said scrap under the exclusive influence of gravity to said selected furnace opening to charge said furnace.

References Cited by the Examiner

UNITED STATES PATENTS

| | | | |
|---|---|---|---|
| 617,663 | 1/1899 | Tomkins | 214—18 |
| 2,669,511 | 2/1954 | Whitney | 75—43 |
| 2,671,724 | 3/1954 | Kompart | 75—43 |
| 2,757,925 | 8/1956 | Carr | 266—13 |
| 2,804,295 | 8/1957 | Brooke | 75—43 |
| 2,818,247 | 12/1957 | Frances | 75—43 |
| 2,886,304 | 5/1959 | Guthrie | 266—13 |
| 3,084,039 | 4/1963 | Baum | 266—34 |
| 3,194,650 | 7/1965 | Kurzinski | 75—60 X |
| 3,221,380 | 12/1965 | Reighart | 266—34 X |

FOREIGN PATENTS 200,174  10/1958  Austria.

OTHER REFERENCES

The Making, Shaping and Treating of Steel, 7th ed., United States Steel Corp., Pittsburgh, Pa., 1957, pages 204–205, 334–355.

DAVID L. RECK, *Primary Examiner.*

HYLAND BIZOT, *Examiner.*

W. C. TOWNSEND, H. W. TARRING,

*Assistant Examiners.*